US009769125B2

(12) United States Patent
Tomokage et al.

(10) Patent No.: US 9,769,125 B2
(45) Date of Patent: Sep. 19, 2017

(54) INFORMATION ADMINISTRATION SYSTEM

(71) Applicants: Zuken Inc., Kanagawa (JP); Fuji Machine Mfg. Co., Ltd., Aichi (JP)

(72) Inventors: Hajime Tomokage, Fukuoka (JP); Hidemichi Kawase, Tokyo (JP); Hiroshi Matsuoka, Tokyo (JP); Hirohiko Matsuzawa, Kanagawa (JP); Kazuhiro Kusunoki, Aichi (JP); Hiroshi Yamazaki, Nagano (JP)

(73) Assignees: ZUKEN INC. (JP); FUJI MACHINE MFG CO LTD (JP); FUKUOKA UNIVERSITY (JP)

( * ) Notice: Subject to any disclaimer, the term of this patent is extended or adjusted under 35 U.S.C. 154(b) by 0 days.

(21) Appl. No.: 14/603,916

(22) Filed: Jan. 23, 2015

(65) Prior Publication Data

US 2015/0200916 A1    Jul. 16, 2015

Related U.S. Application Data

(63) Continuation of application No. PCT/JP2012/068704, filed on Jul. 24, 2012.

(51) Int. Cl.
*H04L 9/32* (2006.01)
*H04L 29/06* (2006.01)
(Continued)

(52) U.S. Cl.
CPC ...... *H04L 63/0428* (2013.01); *G06F 21/6209* (2013.01); *G06F 21/6218* (2013.01); *G06Q 10/0631* (2013.01); *H04L 41/28* (2013.01)

(58) Field of Classification Search
CPC ............... H04L 41/28; H04L 63/0428; H04L 2209/603; H04L 9/0844; H04L 9/3234;
(Continued)

(56) References Cited

U.S. PATENT DOCUMENTS

2003/0009471 A1* 1/2003 Hashizume ............ G06Q 10/10
2004/0030901 A1* 2/2004 Wheeler ................. G06F 21/31
713/176
(Continued)

FOREIGN PATENT DOCUMENTS

JP    H08-044553 U1    2/1996
JP    2007-507041 A    3/2007
(Continued)

OTHER PUBLICATIONS

International Search Report for corresponding International Application No. PCT/JP2012/068704 dated Oct. 23, 2012.
(Continued)

*Primary Examiner* — Gary Gracia
(74) *Attorney, Agent, or Firm* — Duquette Law Group, LLC

(57) ABSTRACT

An information administration system configured of: a component information management apparatus (4) including a component information storing unit (41) storing component information after sectionalizing the component information into public information and non-public information, and also sectionalizing the non-public information into information for designing and information for manufacturing, and an encryption processing unit (42) encrypting the non-public information; a designing information management apparatus (2) including a first component information receiving unit (24) receiving the component information, a first decryption unit (25) decrypting non-public component information for designing, and a designing information storing unit (22) storing designing information that is designed by adding the received component information thereto; and a manufacturing apparatus (3) including a second decryption unit (33) decrypting the received non-public component information for manufacturing, and a drive controlling unit (34) controlling driving of the manufacturing apparatus based on the
(Continued)

received manufacturing information and component information.

5 Claims, 14 Drawing Sheets

(51) Int. Cl.
*H04L 12/24* (2006.01)
*G06F 21/62* (2013.01)
*G06Q 10/06* (2012.01)

(58) Field of Classification Search
CPC ... H04L 9/3271; G06F 17/50; G06F 21/6209;
G06F 21/6218; G06F 17/5081; G06F
21/75; G06F 3/04812; G06F 21/602;
G06F 21/72
USPC ............... 713/164, 150, 165, 168, 176, 194;
705/300, 2, 28, 35; 708/400
See application file for complete search history.

(56) References Cited

U.S. PATENT DOCUMENTS

| | | | |
|---|---|---|---|
| 2005/0071792 A1* | 3/2005 | Ferguson | G06F 21/6209 716/102 |
| 2005/0174975 A1* | 8/2005 | Mgrdechian | G06Q 30/0207 370/338 |
| 2006/0101288 A1* | 5/2006 | Smeets | G06F 21/602 713/194 |
| 2008/0044026 A1* | 2/2008 | Walters | G06F 21/72 705/300 |
| 2009/0138313 A1* | 5/2009 | Morgan | G06Q 10/06 705/7.23 |
| 2011/0119645 A1* | 5/2011 | Koizumi | G06F 17/5081 716/102 |
| 2011/0302776 A1* | 12/2011 | Kato | H05K 13/0452 29/829 |
| 2012/0029680 A1* | 2/2012 | Srikumar | G05B 19/4183 700/115 |
| 2012/0221443 A1* | 8/2012 | Macmillan | G06Q 30/0268 705/28 |
| 2013/0090940 A1* | 4/2013 | Goodnight | G06Q 50/22 705/2 |
| 2014/0136380 A1* | 5/2014 | Chang | G06F 1/28 705/35 |
| 2014/0230052 A1* | 8/2014 | Zhang | G06F 21/575 726/22 |

FOREIGN PATENT DOCUMENTS

| | | |
|---|---|---|
| JP | 2011-107967 A | 6/2011 |
| JP | 2003-044483 A | 2/2013 |
| WO | 0188759 A1 | 11/2001 |
| WO | 2009/034772 A1 | 3/2009 |

OTHER PUBLICATIONS

European Search Report dated Feb. 10, 2016 from corresponding International Application No. PCT/JP2012/068704.

* cited by examiner ably purchased the software; and the system is configured of a plurality of software executing units having a software supplying unit for encrypting the non-public area in the software with an encryption key based on authentication information, an arithmetic processing unit, a memory, a memory controlling unit for controlling access to the memory, an authentication information storage unit for storing the authentication information unique to individual user, a display unit, and an input means; and then the memory controlling unit in the software executing units is provided with an encryption detection circuit for detecting the non-public area and the public area in the software, and a data decryption circuit for generating a decryption key by inputting the authentication information from the authentication information storage unit so as to decrypt the non-public area in the software detected by the encryption detection

INFORMATION ADMINISTRATION SYSTEM

RELATED APPLICATIONS

This patent application is a continuation of International Application No. PCT/JP2012/068704, filed on Jul. 24, 2012, now pending, the contents and teachings of each of which are hereby incorporated by reference in their entirety.

FIELD

The present invention relates to an information administration system which manages component information on components constituting a production object.

BACKGROUND

When manufacturing a production object by a manufacturing apparatus based on information designed by a designer, the designer and manufacturers need information on properties of components constituting the production object (e.g., parts and materials contained in the object to be produced). For example, when manufacturing a semiconductor device, a designer would not be able to carry out the design thereof if the designer did not know electrical properties of the components, and a manufacturer would not be able to normally operate the manufacturing apparatus if the manufacturer did not know the information of the components, such as a shape, size, and stress.

In such a case as described above, since those properties of the product are indicated usually in brochures and the like made open to the public by parts makers, designing information and manufacturing data for operating the manufacturing apparatus are generated by referring to the properties. Generally, however, the property information disclosed in the brochures and the like is indicated with theoretical values calculated by the parts makers, and those are different from effective values of the components actually being on sale. In other words, even though the parts makers open to the public of the theoretical values, they do not open to the public of property information with effective values of the components actually being on sale.

Designers and manufacturers will be able to manufacture the production object more efficiently if they can refer to the property information of the components actually being on sale. Therefore, implementation of a system capable of easily acquiring the non-public property information of the actual components is expected. However, such a system has not yet been established under the present circumstances. One of the reasons may be that the parts makers are concerned about unnecessary leakage of their original component information respectively unique to the makers. Thus, in order to achieve such a system as described above, it is a required task to provide security on the non-public property information of the components so as to prevent the information from being unnecessarily leaked.

As for the problem described above, a technique, although the technique is not for designing and manufacturing, is disclosed in Japanese Unexamined Patent Application Publication No. HEI 8-44553 (Patent Document 1) in which a plurality of users are allowed to use software having an area opened to the public and an area not opened to the public. The technique disclosed in Patent Document 1 is a system letting the software to be used by a plurality of users, where the public area is permitted to be used for production and reproduction by the users, while the non-public area is permitted to be used only by certain users who have regu-

SUMMARY

Problem to be Solved by the Invention

However, as described above, even though the technique disclosed in the Patent Document 1 is capable of ensuring security by encrypting the non-public area in the software, it will not be able to achieve such a system as described above since it is not a technique regarding the information required for designing and manufacturing. Also, in the case of an intangible object such as software, there is not a large difference between the property information opened to the public and the actual product property information, therefore it is difficult to apply the technique disclosed in the Patent Document 1 to the information administration system of the information required for designing and manufacturing, in order to achieve the system described above.

Embodiments of the present invention provides an information administration system configured to safely reflect non-public component information, from among component information on components constituting a production object, to designing information and manufacturing information without leaking to outsiders, thereby allowing the production object to be efficiently manufactured using the non-public information.

Means for Solving the Problem (1) The information administration system according to the present invention is provided with: a designing information management apparatus, which manages designing information of a production object; a manufacturing apparatus, which manufactures the production object based on the designing information; and a component management apparatus, which manages component information on components constituting the production object; wherein the component management apparatus includes: a component information storing means, which stores the component information after sectionalizing the component information into public component information that is open to the public and non-public component information that is not open to the public and is made to correspond to the public component information, and also sectionalizing the non-public component information into non-public component information for designing and non-public component information for manufacturing; an encryption means, which encrypts the non-public component information with respect to each of the designing information management apparatus and the manufacturing apparatus; and a component information transmitting means, which transmits the public component information and the encrypted non-public component information to the respectively corresponding designing information management apparatus and manufacturing apparatus; the designing information management apparatus includes: a first component information receiving means, which receives the component information transmitted from the component management apparatus; a first decryption means, which decrypts the non-public component information for designing when the non-public component information for designing is contained in the received component information; a designing information storing means, which stores the designing information that is designed by adding the received component information thereto; and a manufacturing information transmitting means, which transmits a part or a whole of the designing information as manufacturing information to the manufacturing apparatus; and the manufacturing apparatus includes: a manufacturing information receiving means, which receives the manufacturing information; a second component information receiving means, which receives the component information; a second decryption means, which decrypts the non-public component information for manufacturing when the non-public component information for manufacturing is contained in the received component information; and a drive controlling means, which generates manufacturing data for driving the manufacturing apparatus based on the received manufacturing information and component information, and then controls driving of the manufacturing apparatus.

In this way, the information administration system according to the present invention achieves an effect that, since the non-public component information is transmitted and received to and from the designing information management apparatus and/or the manufacturing apparatus in a state that the non-public component information is encrypted, security of the non-public component information is ensured so that the information can be reflected in the designing information and/or the manufacturing data in a state that leakage of the information is prevented, thereby allowing the production object to be designed and/or manufactured efficiently as compared to a case of using the public property information. For example, a designing margin concerning consideration of variation in component property and a margin required for control at the time of manufacturing can be reduced.

(2) The information administration system according to the present invention is configured that: the manufacturing apparatus includes: an identification information acquiring means, which acquires identification information of a component to be incorporated in the production object at the time of manufacturing the production object; and an identification information comparing means, which compares the acquired identification information with identification information of the component contained in the manufacturing information received by the manufacturing information receiving means; wherein the second decryption means decrypts the non-public component information for manufacturing only when the pieces of identification information are identical to each other as the result of the comparison processing by the identification information comparing means.

In this way, the information administration system according to the present invention achieves an effect that, since the non-public component information for manufacturing is to be decrypted only when a component having been incorporated in the production object at the time of manufacturing the production object and a component contained in the designing information are identical to each other, assurance that the product dealt by the dealer thereof is to be assuredly incorporated in the production object can be obtained, in return for providing the non-public component information for manufacturing, thereby allowing the system to be extremely effectively functioned both for the manufacturer and the provider of the component (e.g., parts maker).

(3) The information administration system according to the present invention is configured that: the component information storing means stores the non-public component information after layering contents thereof in levels respectively corresponding to the designing information management apparatus and the manufacturing apparatus; the encryption means performs encryption processing using respectively different encryption keys corresponding to the respective layered levels; and the first decryption means and the second decryption means respectively perform decryption processing corresponding to the respective layered levels.

In this way, the information administration system according to the present invention achieves an effect that, since the contents of the non-public component information are layered in levels and stored so as to be encrypted with respectively different encryption keys corresponding to the respective levels, each of the levels can be set with respect to each of the designing information management apparatus and manufacturing apparatus, thereby allowing the non-public component information to be prevented from being disclosed more than necessary.

(4) The information administration system according to the present invention is provided with: a designing information management apparatus, which manages designing information of a production object; a manufacturing apparatus, which manufactures the production object based on the designing information; a component management apparatus, which manages component information on components constituting the production object; and a manufacturing apparatus maker management apparatus, which is managed by a manufacturing apparatus maker for making the manufacturing apparatus; wherein the component management apparatus includes: a component information storing means, which stores the component information after sectionalizing the component information into public component information that is open to the public and non-public component information that is not open to the public and is made to correspond to the public component information, and also sectionalizing the non-public component information into non-public component information for designing and non-public component information for manufacturing; an encryption means, which encrypts the non-public component information with respect to each of the designing information management apparatus and manufacturing apparatus; and a component information transmitting means, which transmits the public component information and the encrypted non-public component information to the respectively corresponding designing information management apparatus and manufacturing apparatus maker management apparatus of the manufacturing apparatus maker for making the manufacturing apparatus; the designing information management apparatus includes: a first component information receiving means, which receives the component information transmitted from the component management apparatus; a first decryption means, which decrypts the non-public component information for designing when the non-public component information for designing is contained in the received component information; a designing information storing means, which stores the designing information that is designed by adding the received component information thereto; and a manufacturing information transmitting means, which transmits a part or a whole of the designing information as manufacturing information to the manufacturing apparatus; and the manufacturing apparatus maker management apparatus includes: a second component information receiving means, which receives the component information; a second decryption means, which decrypts the non-public component information for manufacturing when the non-public component information for manufacturing is contained in the received component information; a library information generating means, which generates library information for the manufacturing apparatus according to the contents of the component information, based on the received component information; and a library information transmitting means, which transmits the library information to the manufacturing apparatus; the manufacturing apparatus includes: a manufacturing information receiving means, which receives the manufacturing information; a library information receiving means, which receives the library information; and a drive controlling means, which generates manufacturing data for driving the manufacturing apparatus based on the received manufacturing information and library information, and then controls driving of the manufacturing apparatus.

In this way, the information administration system according to the present invention achieves an effect that, since the non-public component information is transmitted and received to and from the designing information management apparatus and/or the manufacturing apparatus maker management apparatus in a state that the non-public component information is encrypted, the non-public component information is not transmitted to the end manufacturers, and security of the non-public component information is ensured so that the information can be reflected in the designing information and/or the manufacturing data in a state that leakage of the information is prevented, thereby allowing the production object to be designed and/or manufactured efficiently as compared to a case of using the public property information.

Further, as described above, the system achieves an effect that, since the non-public component information is not transmitted to the end manufacturers, the non-public information can be prevented from spreading more than necessary.

(5) The information administration system according to the present invention is configured that: the library information generating means generates: first library information, which is based on the contents of the non-public component information for manufacturing in the component information; and second library information, which is based only on the public component information without regard for the contents of the non-public component information for manufacturing; the manufacturing apparatus includes: an identification information acquiring means, which acquires identification information of a component to be incorporated in the production object at the time of manufacturing the production object; and an identification information comparing means, which compares the acquired identification information with identification information of the component contained in the manufacturing information received by the manufacturing information receiving means; and as the result of the comparison processing by the identification information comparing means, the drive controlling means generates: manufacturing data based on the first library information when the pieces of identification information are identical to each other; and manufacturing data based on the second library information when the pieces of identification information are not identical to each other.

In this way, the information administration system according to the present invention achieves an effect that, since the first library information generated based on the contents of the non-public component information for manufacturing is to be used only when a component having been incorporated in the production object at the time of manufacturing the production object and a component contained in the designing information are identical to each other, assurance that the product dealt by the dealer thereof is to be assuredly incorporated in the production object can be obtained, in return for providing the non-public component information for manufacturing, thereby allowing the system to be extremely effectively functioned both for the manufacturer and the provider of the component (e.g., parts maker).

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Hereinafter, embodiments of the present invention will be described. Throughout all the embodiments, the same numerals are put to the same components respectively.

First Embodiment of the Invention

An information administration system according to this embodiment will be described using FIG. 1 to FIG. 6. Here, assuming that a production object is a semiconductor device, and a case of effectively utilizing non-public information of components constituting the semiconductor device (e.g., parts to be incorporated in the semiconductor device) in the process of designing and manufacturing of the semiconductor device, will be described. Meanwhile, the information administration system of the present invention can be applied not only to designing and manufacturing of semiconductor devices but also to designing and manufacturing of other products, in the case of manufacturing a production object using parts and materials (components) based on designed information, for example, designing and manufacturing of a vehicle, a building, an electrical appliance, etc.

Figure 1:
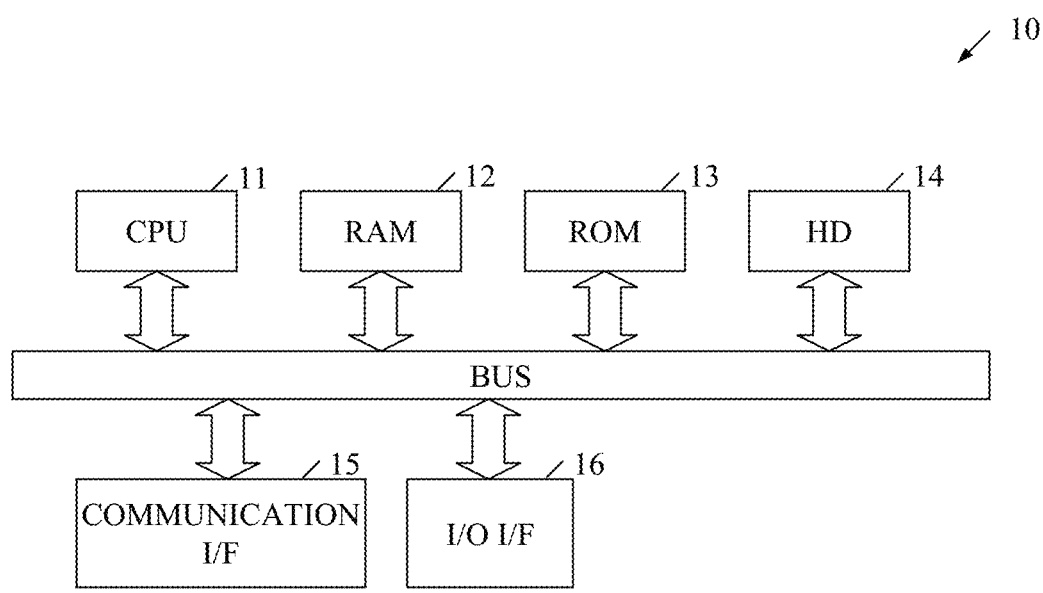
FIG. 1 is a hardware configuration diagram of a computer constituting an information administration system according to a first embodiment.

FIG. 1 is a hardware configuration diagram of a computer constituting an information administration system according to this embodiment. In FIG. 1, a computer 10 is provided with: a CPU 11, a RAM 12, a ROM 13, a hard disc (referred to as HD) 14, a communication OF 15, and an input-output (I/O) OF 16. An operation system and a various types of programs (e.g., an encryption program, a decryption program, etc.) are stored in the ROM 13 and the HD 14, and then each of the programs is read out on the RAM 12, as necessary, to be executed by the CPU 11.

The communication I/F 15 is an interface for performing communication between other apparatuses (e.g., a designing information management apparatus, a component information management apparatus, a manufacturing apparatus, etc.). The I/O I/F 16 is an interface for receiving input from input devices such as a keyboard and a mouse, and for outputting data to a printer, a monitor, and the like. This I/O I/F 16 can be connected with a drive that supports removable discs such as a magneto-optical (MO) disc, a floppy disc, a CD-R, a DVD-R, etc., as necessary. Each processing unit is connected via a bus so as to exchange information there between.

In addition, the configuration of the computer 10 described above is merely an example, and it can be changed as necessary. Also, particularly for the manufacturing apparatus, the hardware configuration varies depending on the components to be manufactured and the manufacturing process, therefore it is not limited to the configuration shown in FIG. 1.

Figure 2:
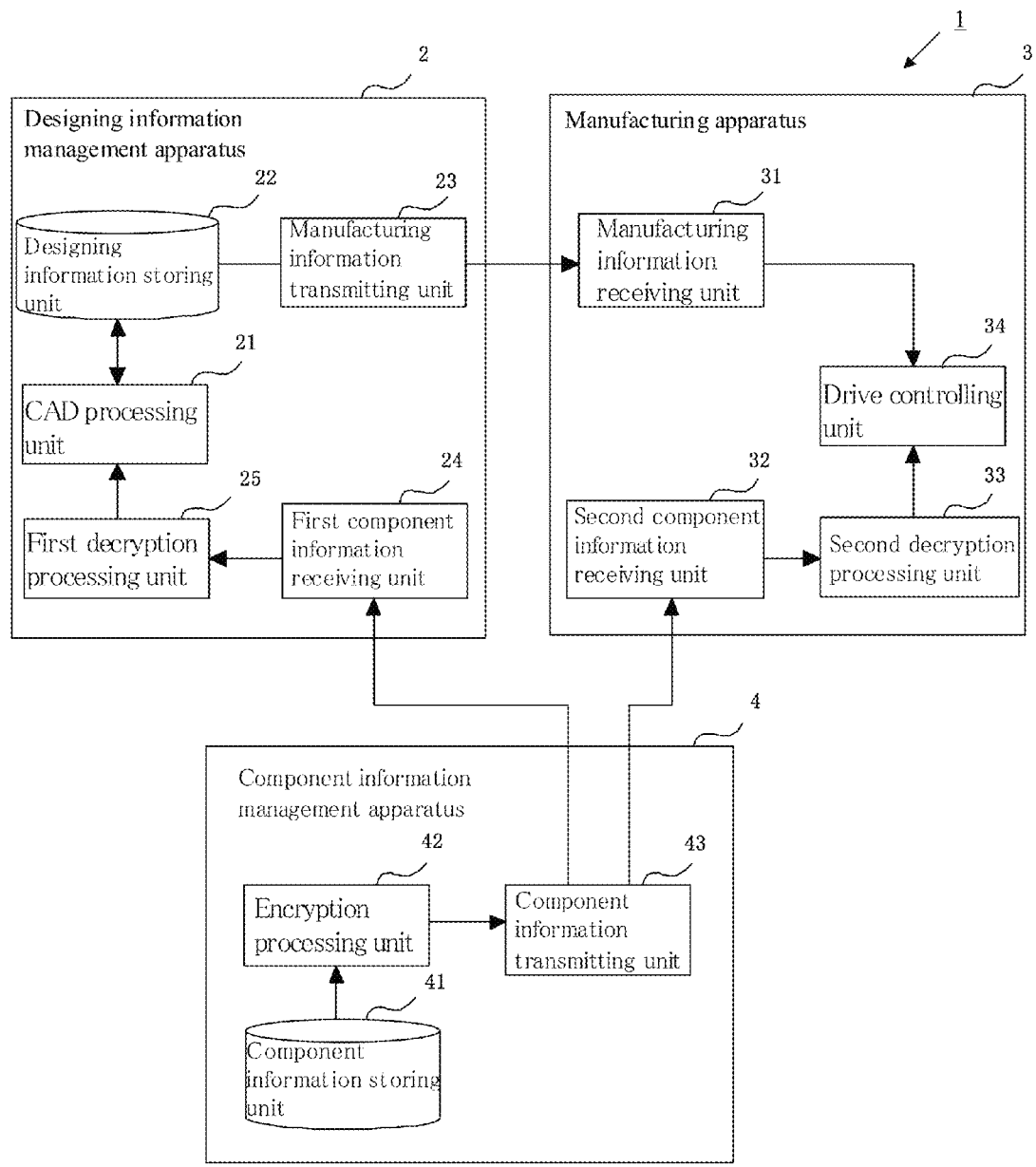
FIG. 2 is a functional block diagram of an information administration system according to the first embodiment.

FIG. 2 is a functional block diagram of the information administration system according to this embodiment. The information administration system 1 is provided with: a designing information management apparatus 2, which manages designing information of a semiconductor device as a production object; a manufacturing apparatus 3, which is used for manufacturing the semiconductor device; and a component information management apparatus 4, which manages information on components that may be incorporated in the semiconductor device. The designing information management apparatus 2 is managed by a design manager, and in the designing information management apparatus 2, designing of the semiconductor device is performed using software such as CAD, and then the designing information is stored. The manufacturing apparatus 3 is managed by a manufacture manager (e.g., a microchip mounting operator or a wire bonding operator), and the manufacturing apparatus 3 is driven based on manufacturing information extracted from the designing information so as to manufacture the semiconductor device. The component information management apparatus 4 is managed by a component manager (e.g., a manufacturer and/or a distributor of parts), and in the component information management apparatus 4, information on components (e.g., a resistance, a condenser, a coil, etc.) which may be incorporated in the semiconductor device are stored.

The component information management apparatus 4 is provided with: a component information storing unit 41, which stores information on components dealt by the dealer thereof; an encryption processing unit 42, which encrypts non-public component information from among the component information in the component information storing unit 41; and a component information transmitting unit 43, which transmits the component information to the designing information management apparatus 2 and the manufacturing apparatus 3, responding to a request from the design manager or the manufacture manager. Hereinafter, the component information stored in the component information storing unit 41 will be described below.

Figure 3:
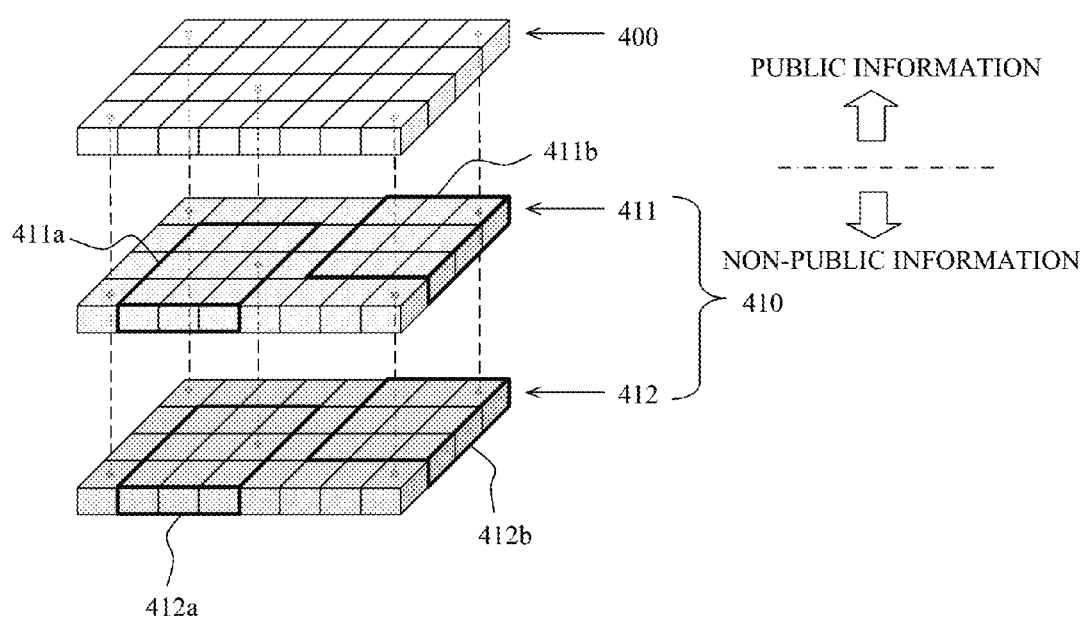
FIG. 3 is a conceptual diagram of component information in the information administration system according to the first embodiment.

FIG. 3 is a conceptual diagram of the component information stored in the component information storing unit 41. The component information has public component information 400, which is opened to the public through brochures, websites, etc., and non-public component information 410, which is not opened to the public and is in a state of being made to correspond to the public component information 400. Further, the non-public component information 410 is layered in a plurality of levels in accordance with the degree of secrecy, and in the case of FIG. 3, it is layered in a level of non-public component information 411 that is relatively low in secrecy, and in a level of non-public component information 412 that is relatively high in secrecy. However, layering of the non-public component information 410 is not always a required configuration. And, the non-public component information 410 may be layered in three or more levels.

Further, the non-public component information 410 has non-public component information for designing 411a, 412a and non-public component information for manufacturing 411b, 412b, with respect to each region, in which the pieces of non-public component information for designing 411a, 412a are transmitted to the designing information management apparatus 2 to be utilized for designing, while the pieces of non-public component information for manufacturing 411b, 412b are transmitted to the manufacturing apparatus 3 to be utilized for manufacturing. Specifically, property information (e.g., a resistance value for resistance, a size, a 3D shape, a threshold limit value, surface treatment, quality of material (heat resistance), etc.) of the component open to the public is stored in each region of the public component information 400, and the same kind of property information is also stored in each region of the non-public component information 410 corresponding to each region of the public component information 400. In this regard, the information stored in the non-public component information 410 is not generally opened to the public, therefore, for example, an effective value of each property information, more detailed information, etc. are stored therein. In the respective pieces of property information, property information particularly required at the time of designing (e.g., electrical property information such as a resistance value) is specified as non-public component information for designing 411a, 412a, while property information particularly required at the time of manufacturing (e.g., mechanical property information such as stress) is specified as non-public component information for manufacturing 411b, 412b.

The component information is stored in the component information storing unit 41 in the component information management apparatus 4, with the concept described above. The encryption processing unit 42 encrypts information corresponding to the non-public component information 410 from among the component information. In this regard, if the non-public component information 410 is layered in a plurality of levels, encryption is to be performed using an encryption key being different with respect to each of the levels. This means that, in the decryption keys, some can decrypt every non-public component information 410, while some can only decrypt the non-public component information 411 and cannot decrypt the non-public component information 412.

Referring back to FIG. 2, the designing information management apparatus 2 is provided with: a CAD processing unit 21, which performs designing of a semiconductor device in accordance with an operation by a designer; a designing information storing unit 22, which stores designing information designed by the CAD processing unit 21; a manufacturing information transmitting unit 23, which transmits a whole or a part of the designing information as manufacturing information to the manufacturing apparatus 3 responding to a request from the manufacture manager side; a first component information receiving unit 24, which receives component information transmitted from the component information management apparatus 4; and a first decryption processing unit 25, which decrypts the encrypted non-public component information for designing 411a, 412a when the pieces of non-public component information for designing 411a, 412a are contained in the component information received by the first component information receiving unit 24.

The manufacturing apparatus 3 is provided with: a manufacturing information receiving unit 31, which receives manufacturing information transmitted from the designing information management apparatus 2; a second component information receiving unit 32, which receives component information transmitted from the component information management apparatus 4; a second decryption processing unit 33, which decrypts the encrypted non-public component information for manufacturing 411b, 412b when the pieces of non-public component information for manufacturing 411b, 412b are contained in the component information received by the second component information receiving unit 32; and a drive controlling unit 34, which generates the manufacturing data for driving the manufacturing apparatus 3 based on the decrypted manufacturing information and the component information received by the manufacturing information receiving unit 31, and then controls driving of the manufacturing apparatus 3.

In this regard, decryption keys for decrypting the non-public component information for designing 411a, 412a, and decryption keys for decrypting the non-public component information for manufacturing 411b, 412b should have been distributed in advance, by a third-party institution that manages whole the information administration system 1 or by a component manager. Meanwhile, when any non-public component information 410 is not contained in the component information, designing and manufacturing are respectively performed by the designing information management apparatus 2 and the manufacturing apparatus 3 based on the public component information 400.

Figure 4:
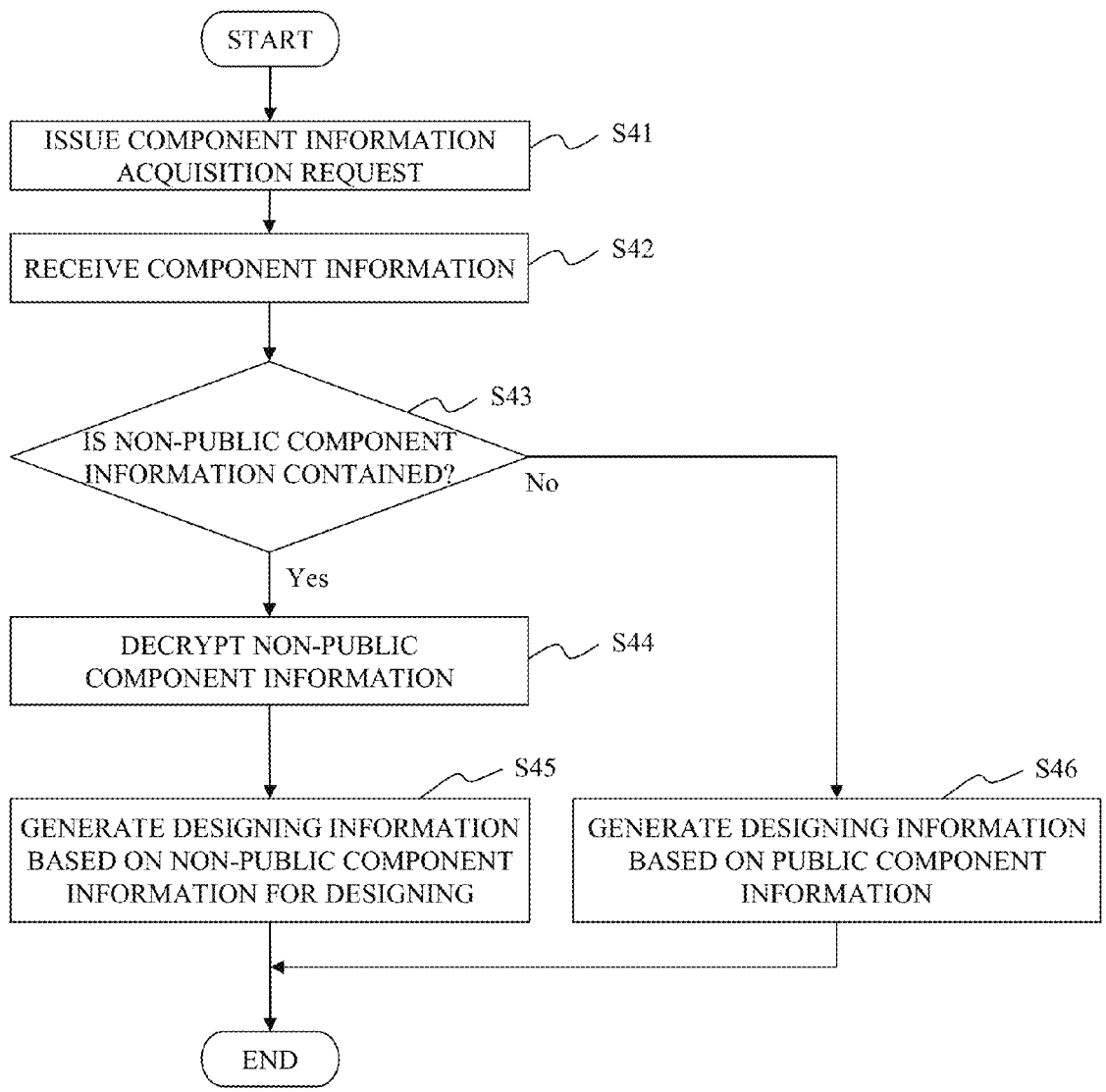
FIG. 4 is a flowchart showing an operation of a designing information management apparatus in the information administration system according to the first embodiment.

Operations of the respective apparatuses will be described. FIG. 4 is a flowchart showing an operation of the designing information management apparatus 2. First, the designing information management apparatus 2 issues an acquisition request for component information, which is necessary for designing, to the component information management apparatus 4 (S41), and the first component information receiving unit 24 receives the component information responding to the request (S42). The received component information is judged whether any non-public component information for designing 411a, 412a is contained therein (S43). When it is not contained, designing information is generated using the CAD processing unit 21 based on the public component information 400, and is to be stored in the designing information storing unit 22 (S46). On the other hand, when it is contained, the first decryption processing unit 25 decrypts the non-public component information for designing 411a, 412a using a decryption key which has been distributed in advance (S44). And, designing information is generated using the CAD processing unit 21 based on the decrypted non-public component information for designing 411a, 412a, and is to be stored in the designing information storing unit 22 (S45). Thereafter, the manufacturing information transmitting unit 23 transmits a whole or a part of the generated designing information to the manufacturing apparatus 3 as manufacturing information, in accordance with a request from the manufacture manager side.

Figure 5:
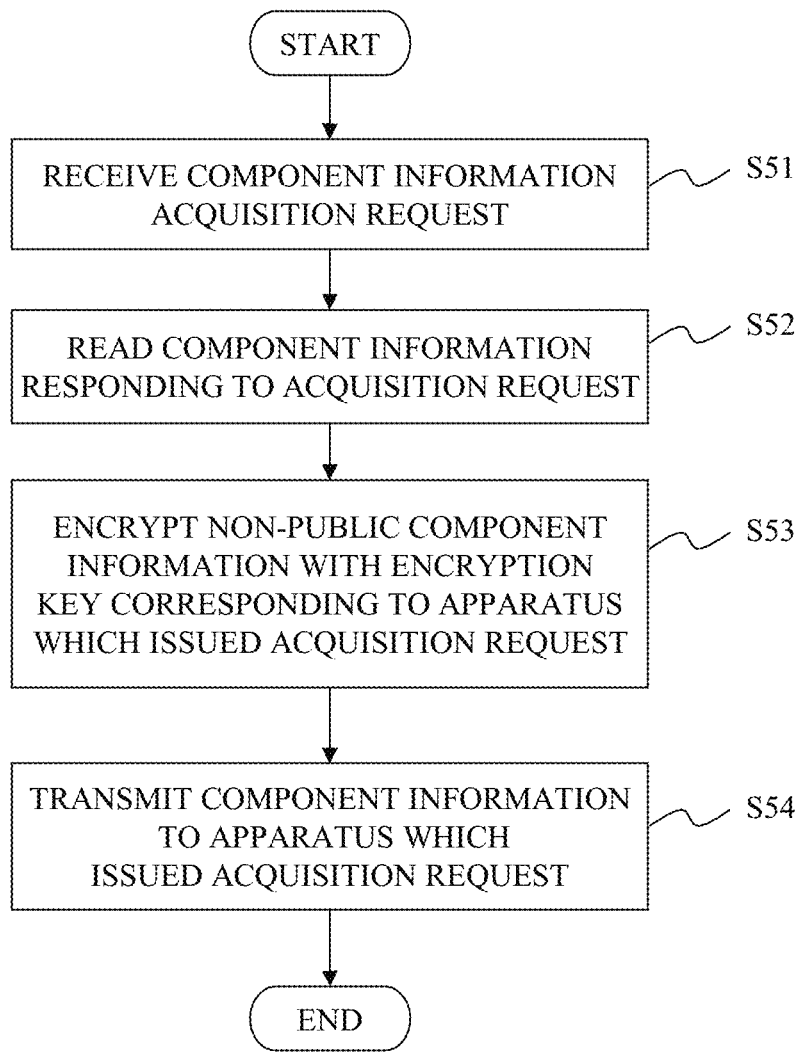
FIG. 5 is a flowchart showing an operation of a component information management apparatus in the information administration system according to the first embodiment.

FIG. 5 is a flowchart showing an operation of the component information management apparatus 4. First, upon receiving a component information acquisition request based on an instruction from a design manager or a manufacture manager (S51), the component information management apparatus 4 reads component information from the component information storing unit 41 responding to the acquisition request (S52). When any non-public component information 410 is requested to be acquired, the encryption processing unit 42 encrypts the non-public component information 410 with an encryption key corresponding to either the designing information management apparatus 2 or the manufacturing apparatus 3, which issued the acquisition request (S53). The component information transmitting unit 43 transmits the component information to either the designing information management apparatus 2 or the manufacturing apparatus 3, which issued the acquisition request (S54), and then the process ends.

In this regard, if the non-public component information 410 is layered in levels, it is to be encrypted using an encryption key corresponding to each of the levels. As for determination of the encryption key to be used, it may be decided among managers in advance, the level of the intended information may be specified and requested to be acquired at the time of issuing the acquisition request, or the level may be decided by the component information management apparatus 4 side in accordance with the value.

Figure 6:
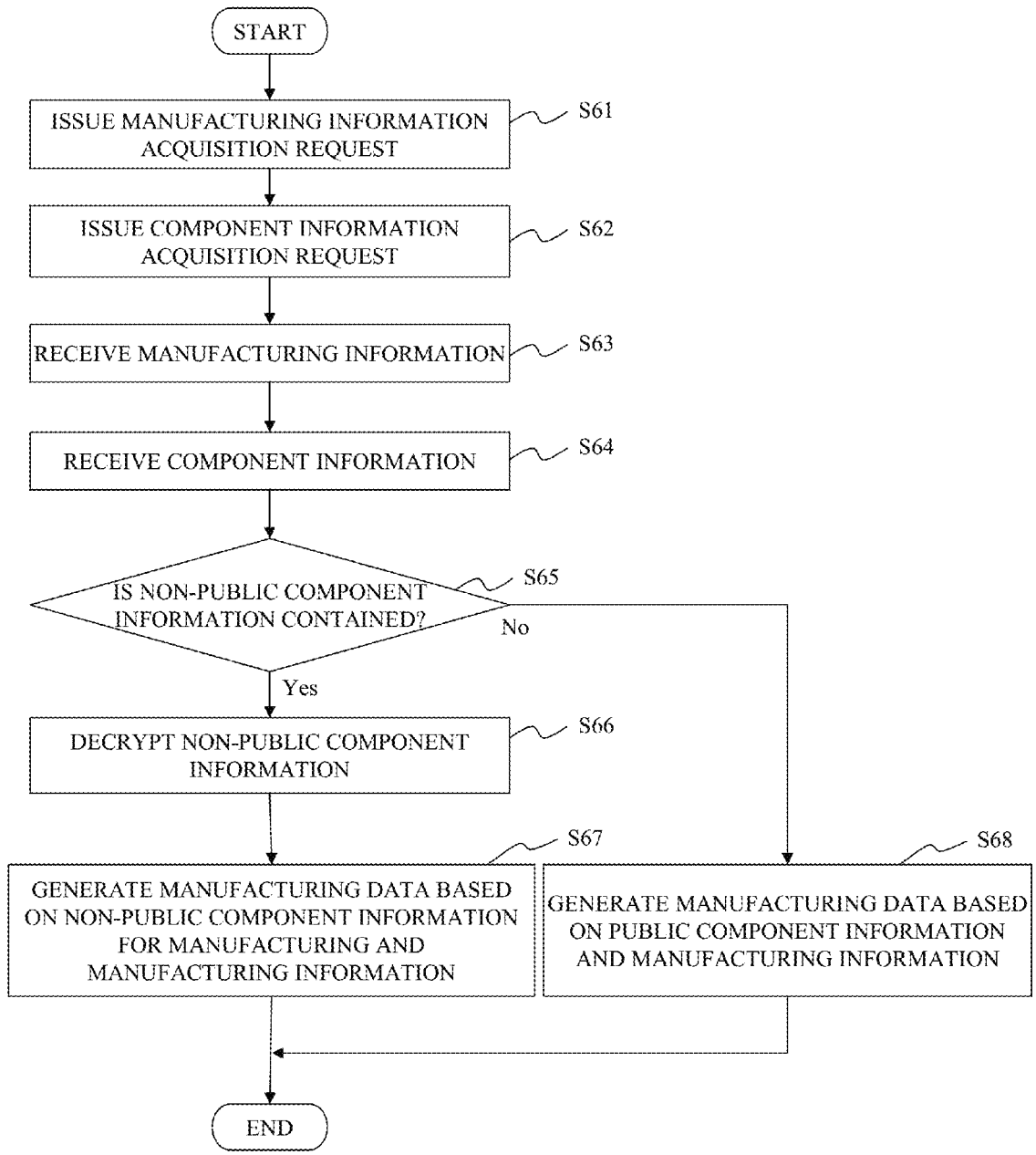
FIG. 6 is a flowchart showing an operation of a manufacturing apparatus in the information administration system according to the first embodiment.

FIG. 6 is a flowchart showing an operation of the manufacturing apparatus 3. First, the manufacturing apparatus 3 issues an acquisition request for manufacturing information to the designing information management apparatus 2, and issues an acquisition request for component information to the component information management apparatus 4 (S61, S62). The manufacturing information receiving unit 31 receives the manufacturing information (S63), and the second component information receiving unit 32 receives the component information (S64), responding to the respective acquisition requests. The component information is judged whether any non-public component information for manufacturing 411b, 412b is contained therein (S65). When it is not contained, the drive controlling unit 34 generates the manufacturing data for normally driving the manufacturing apparatus 3 based on the public component information 400 and the received manufacturing information (S68). On the other hand, when it is contained, the second decryption processing unit 33 decrypts the non-public component information for manufacturing 411b, 412b using a decryption key which has been distributed in advance (S66). And, the drive controlling unit 34 generates the manufacturing data for normally driving the manufacturing apparatus 3 based on the decrypted non-public component information for manufacturing 411b, 412b and the received manufacturing information (S67). Thereafter, the manufacturing apparatus 3 is to be driven in accordance with the generated manufacturing data, and then a semiconductor device as a production object is to be manufactured.

As is described above, since the non-public component information 410 is transmitted and received to and from the designing information management apparatus 2 and/or the manufacturing apparatus 3 in a state that the non-public component information 410 is encrypted, security of the non-public component information 410 is ensured so that the information can be reflected in the designing information and/or the manufacturing data in a state that leakage of the information is prevented, thereby allowing the semiconductor device with such a performance and function to be designed and/or manufactured as that could not have been achieved with opened property information of the components.

Second Embodiment of the Invention

An information administration system according to this embodiment will be described using FIG. 7 and FIG. 8. The information administration system according to this embodiment is enhanced from the information administration system according to the first embodiment in function that the non-public component information can be referred to only when a component contained in the designing information is identified to be the same as a component being incorporated in a semiconductor device, at the time of manufacturing the semiconductor device by the manufacturing apparatus.

In this regard, description overlapping with the description of the first embodiment will be omitted, in this embodiment.

Figure 7:
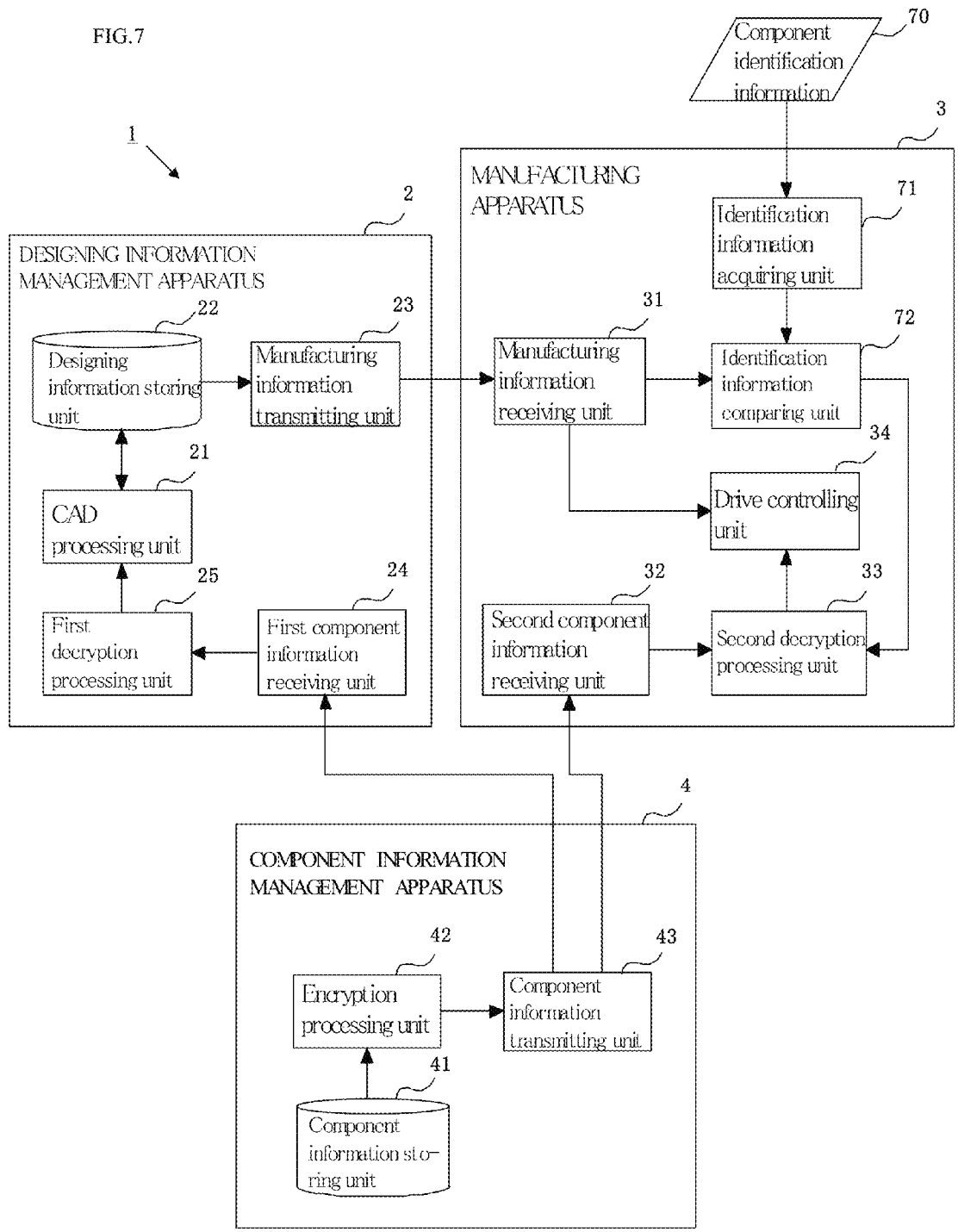
FIG. 7 is a functional block diagram of an information administration system according to a second embodiment.
Figure 8:
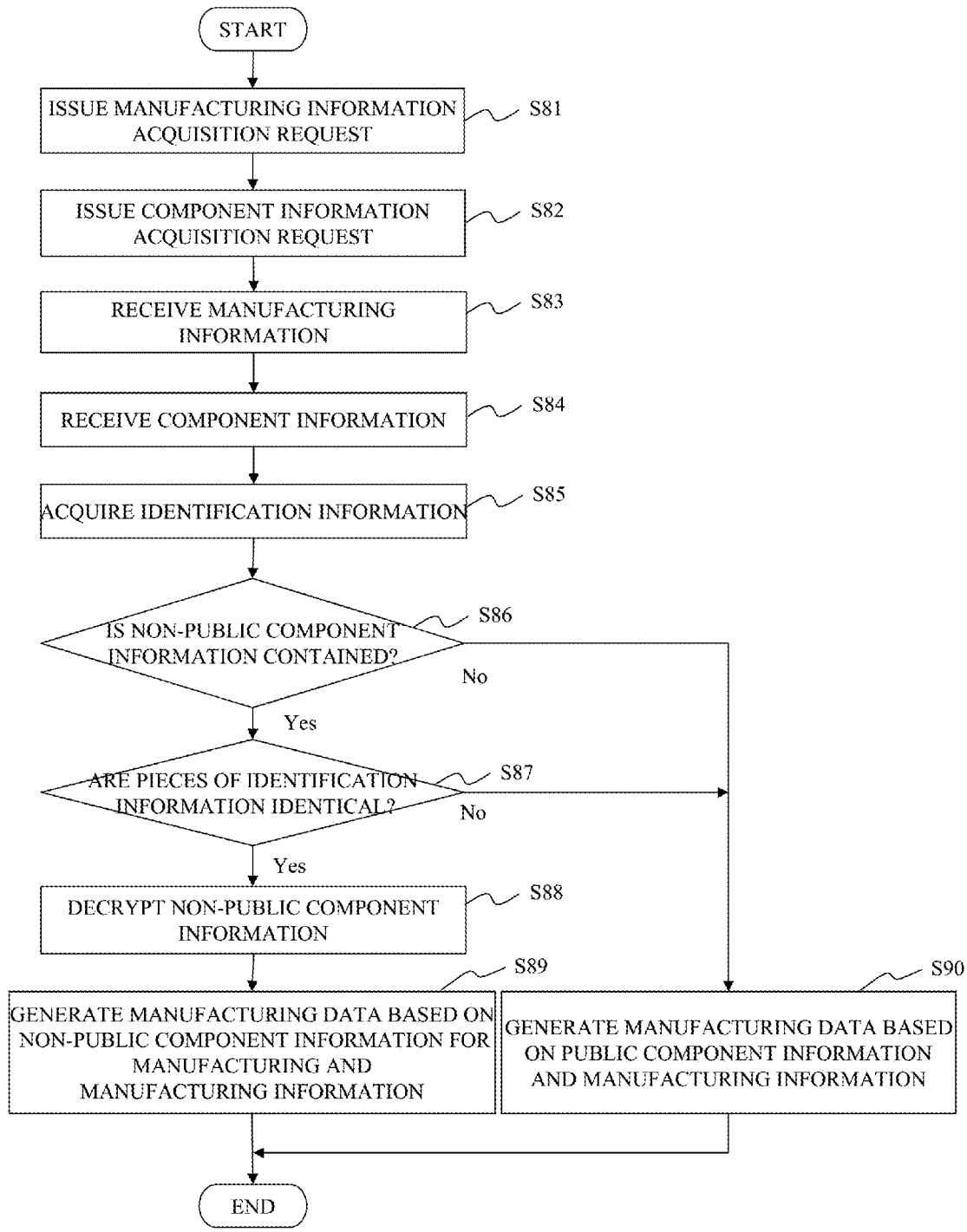
FIG. 8 is a flowchart showing an operation of a manufacturing apparatus in the information administration system according to the second embodiment

FIG. 7 is a functional block diagram of the information administration system according to this embodiment. Although the configuration of the designing information management apparatus 2 and the configuration of the component information management apparatus 4 are respectively the same as those in the first embodiment shown in FIG. 2, the configuration of the manufacturing apparatus 3 is different therefrom. The manufacturing apparatus 3 is newly provided with: an identification information acquiring unit 71, which acquires identification information 70 of a component to be incorporated in a semiconductor device at the time of manufacturing the semiconductor device; and an identification information comparing unit 72, which judges whether the acquired the identification information 70 of the component and identification information of a component contained in the manufacturing information received by the manufacturing information receiving unit 31 (i.e., the identification information of the component incorporated in the designing information at the time of designing) are identical to each other.

As the result of the judgment by the identification information comparing unit 72, when the pieces of identification information are identical, it indicates that the component according to the component information provided from the component information management apparatus 4 has been properly used at the time of manufacturing, therefore the pieces of non-public component information for manufacturing 411b, 412b are to be decrypted by the second decryption processing unit 33, and then the manufacturing apparatus 3 is to be driven with the manufacturing data based on the non-public component information for manufacturing 411b, 412b. On the other hand, when the pieces of identification information are not identical, it indicates that the component according to the component information provided from the component information management apparatus 4 has not been properly used at the time of manufacturing, therefore decryption of the pieces of non-public component information for manufacturing 411b, 412b are not to be performed by the second decryption processing unit 33, and then the manufacturing apparatus 3 is to be driven with the manufacturing data based on the public component information 400.

Next, operations of the information administration system 1 will be described. Operations of the designing information management apparatus 2 and the component information management apparatus 4 are respectively the same as the operations thereof shown in FIG. 4 and FIG. 5 according to the first embodiment. FIG. 8 is a flowchart showing an operation of the manufacturing apparatus 3 according to this embodiment. The process in steps S81 to S84 are the same as the process in S61 to S64 shown in FIG. 6. The identification information acquiring unit 71 acquires the identification information 70 of the component to be incorporated at the time of manufacturing (S85). The identification information 70 can be acquired, for example, from the information of a bar code or a QR code indicated on a reel etc. of the component.

The component information is judged whether any non-public component information for manufacturing 411b, 412b is contained therein (S86). When it is not contained, the drive controlling unit 34 generates manufacturing data for normally driving the manufacturing apparatus 3 based on the public component information 400 and the received manufacturing information (S90). On the other hand, when it is contained, the identification information comparing unit 72 judges whether the pieces of identification information are identical to each other (S87). When they are not identical, the process in S90 is executed. On the other hand, when they are identical, the second decryption processing unit 33 decrypts the non-public component information for manufacturing 411b, 412b using a decryption key which has been distributed in advance (S88). And, the drive controlling unit 34 generates manufacturing data for normally driving the manufacturing apparatus 3 based on the decrypted non-public component information for manufacturing 411b, 412b and the received manufacturing information (S89). Thereafter, the manufacturing apparatus 3 is to be driven in accordance with the generated manufacturing data, and then a semiconductor device as a production object is to be manufactured.

In this way, since the pieces of non-public component information for manufacturing 411b, 412b can be decrypted only when a component to be incorporated in a semiconductor device at the time of manufacturing the semiconductor device and a component contained in the designing information are identical to each other, the component manager can obtain assurance that the product dealt by the component manager's company to be assuredly incorporated in the semiconductor device, in return for providing the non-public component information for manufacturing 411b, 412b, thereby allowing the system to be extremely effectively functioned both for the manufacturer and the parts maker.

Third Embodiment of the Invention

An information administration system according to this embodiment will be described using FIG. 9 to FIG. 11. The information administration system according to this embodiment is different from the information administration system according to the first embodiment in that the component information is not directly provided to the manufacturing apparatus but is provided in a form being embedded in library information via the manufacturing apparatus maker for making the manufacturing apparatus (the manufacturing apparatus maker management apparatus).

In this regard, description overlapping with the description in each of the above embodiments will be omitted, in this embodiment.

Figure 9:
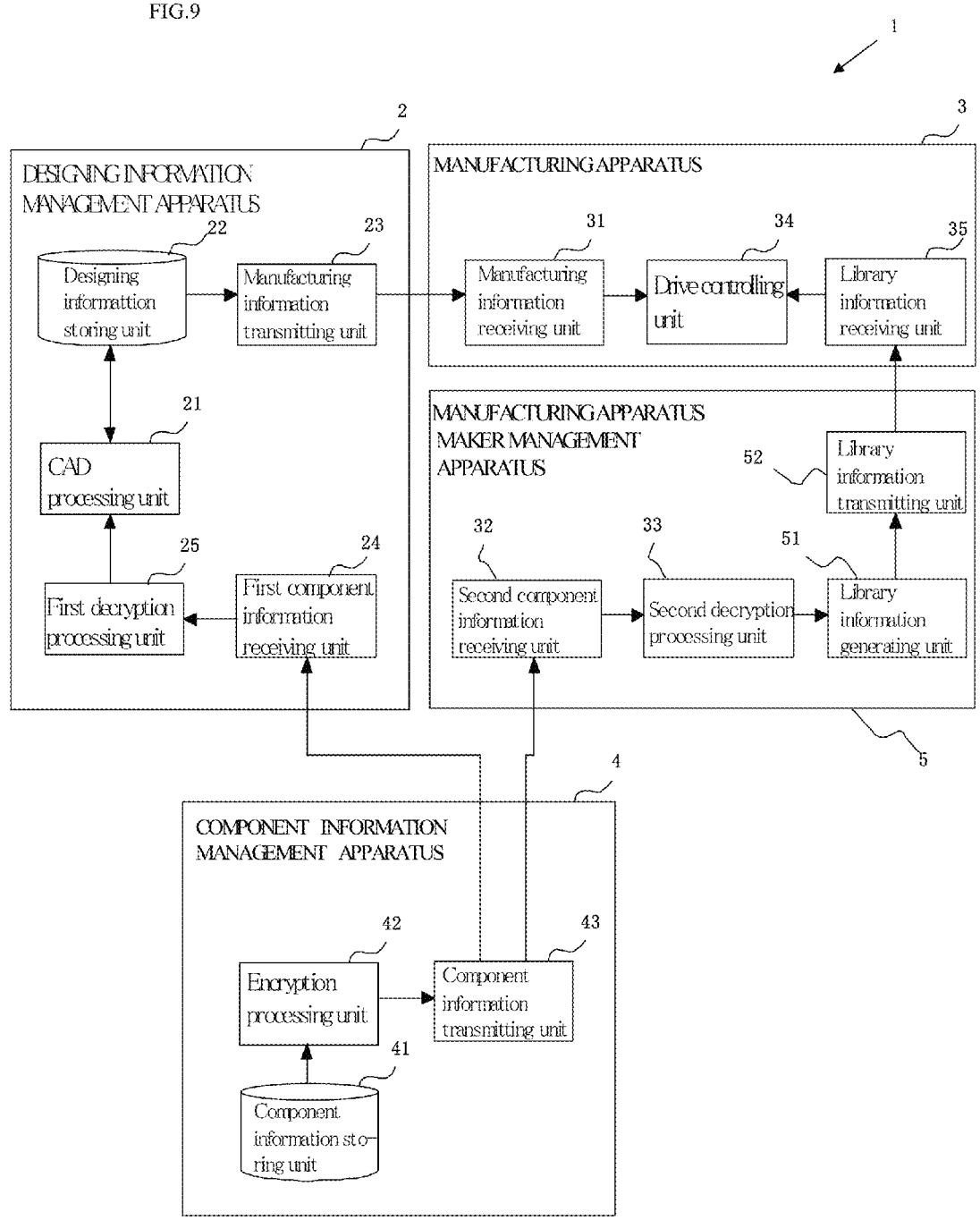
FIG. 9 is a functional block diagram of an information administration system according to a third embodiment.
Figure 10:
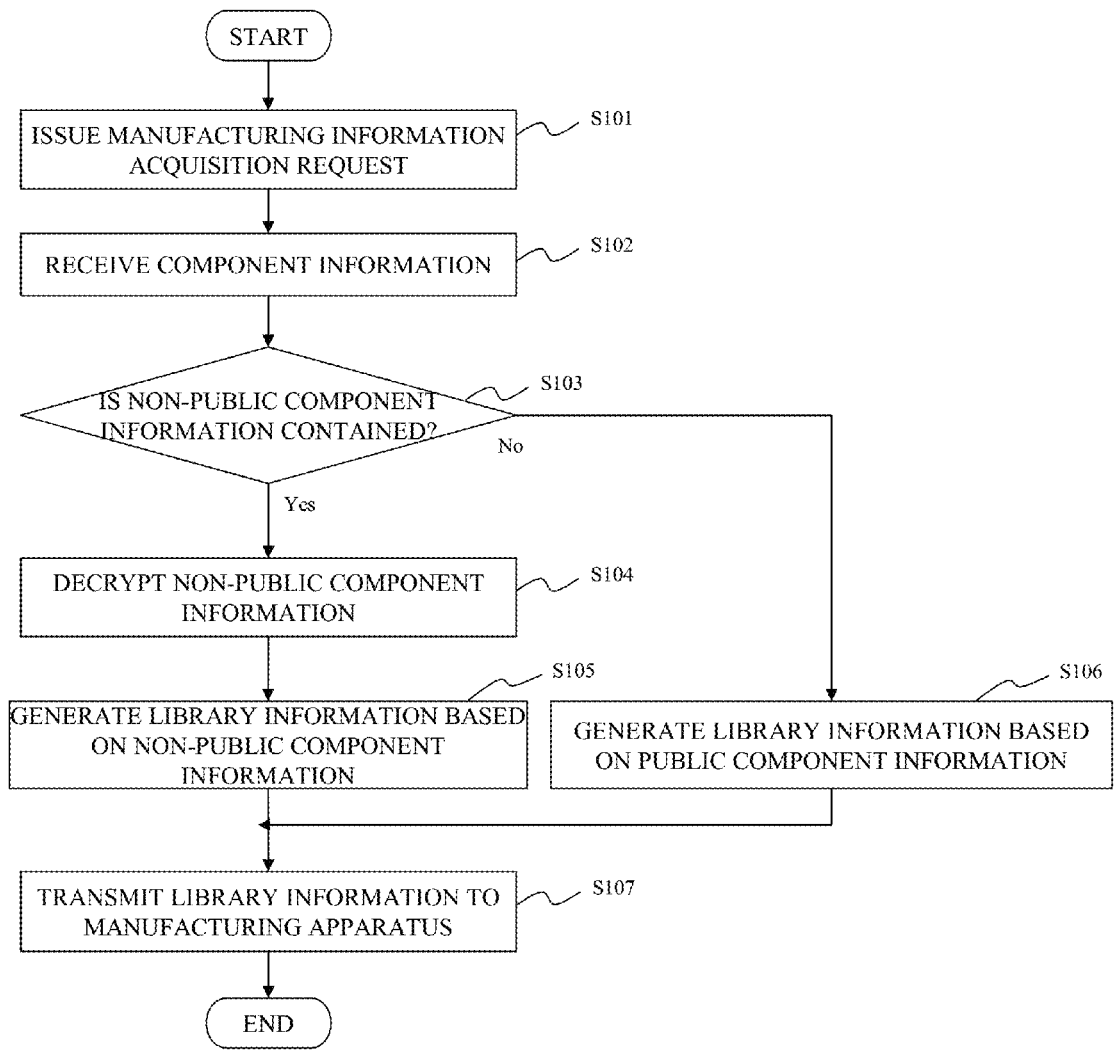
FIG. 10 is a flowchart showing an operation of a manufacturing apparatus maker management apparatus in the information administration system according to the third embodiment.

FIG. 9 is a functional block diagram of the information administration system according to this embodiment. A point different from the first embodiment shown in FIG. 2 is that this embodiment is provided with a manufacturing apparatus maker management apparatus 5 which is managed by a manufacturing apparatus maker for making the manufacturing apparatus (e.g., a manufacturing apparatus maker for making a wire bonding apparatus), in addition to the designing information management apparatus 2, the component information management apparatus 4, and the manufacturing apparatus 3. Although the configuration of the designing information management apparatus 2 and configuration of the component information management apparatus 4 are respectively almost the same as those in the first embodiment shown in FIG. 2, the component information transmitting unit 43 does not transmit the component information to the manufacturing apparatus 3 but to the manufacturing apparatus maker management apparatus 5, instead.

In the manufacturing apparatus maker management apparatus 5, the second component information receiving unit 32 receives component information from the component information management apparatus 4. Then, if any non-public component information for manufacturing 411b, 412b is contained in the component information, the second decryption processing unit 33 decrypts the encrypted non-public component information for manufacturing 411b, 412b with a decryption key which has been distributed in advance. A library information generating unit 51 generates library information of a program for operating the manufacturing apparatus 3 based on the decrypted non-public component information for manufacturing 411b, 412b, and then a library information transmitting unit 52 transmits the generated library information to the manufacturing apparatus 3.

A library information receiving unit 35 in the manufacturing apparatus 3 receives the library information from the manufacturing apparatus maker management apparatus 5. And, manufacturing data for driving the manufacturing apparatus 3 is generated by the drive controlling unit 34 based on the received library information and the manufacturing information received by the manufacturing information receiving unit 31, and then drive-control on the manufacturing apparatus 3 is to be performed.

Next, operations of the information administration system 1 will be described. Operations of the designing information management apparatus 2 and the component information management apparatus 4 are respectively the same as the operations thereof shown in FIG. 4 and FIG. 5 according to the first embodiment. FIG. 10 is a flowchart showing an operation of the manufacturing apparatus maker management apparatus 5 according to this embodiment. First, the manufacturing apparatus maker management apparatus 5 issues an acquisition request for component information to the component information management apparatus 4 (S101). The second component information receiving unit 32 receives the component information responding to the acquisition request (S102). The component information is judged whether any non-public component information for manufacturing 411b, 412b is contained therein (S103). When it is not contained, the library information generating unit 51 generates library information for operating the manufacturing apparatus 3 based on the public component information 400 (S106). On the other hand, when it is contained, the second decryption processing unit 33 decrypts the non-public component information for manufacturing 411b, 412b using a decryption key which has been distributed in advance (S104). And, the library information generating unit 51 generates library information for operating the manufacturing apparatus 3 based on the decrypted non-public component information for manufacturing 411b, 412b (S105). Then, the library information transmitting unit 52 transmits the generated library information to the manufacturing apparatus 3 (S107).

Figure 11:
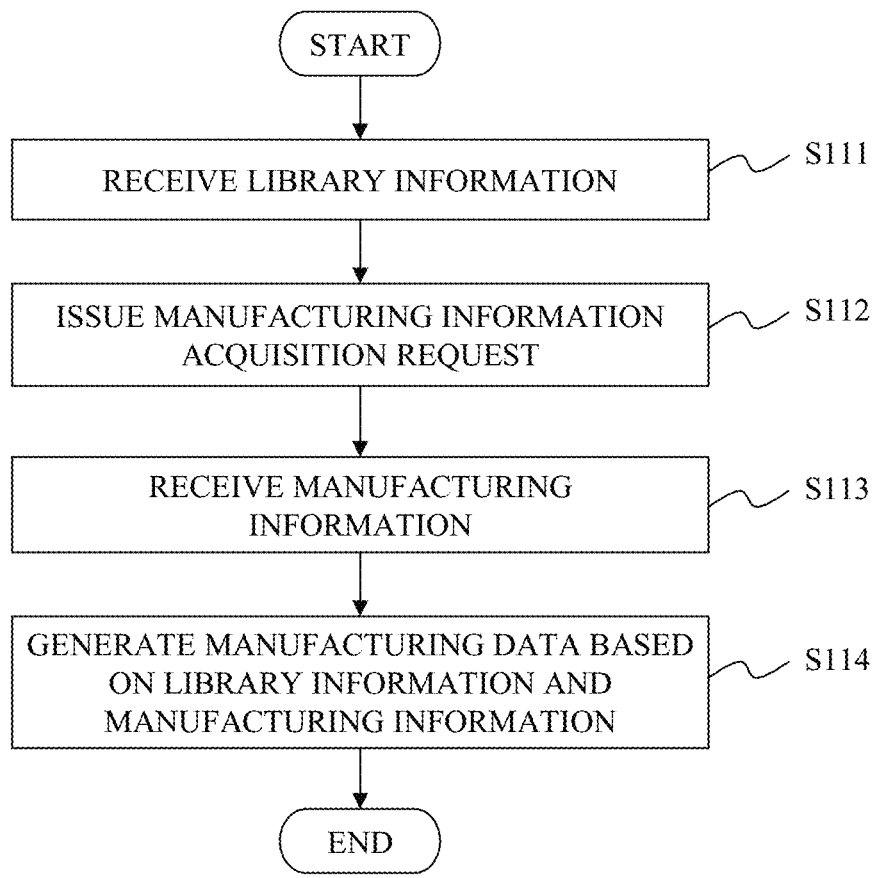
FIG. 11 is a flowchart showing an operation of a manufacturing apparatus in the information administration system according to the third embodiment.

FIG. 11 is a flowchart showing an operation of the manufacturing apparatus 3. First, the library information receiving unit 35 receives the library information transmitted from the manufacturing apparatus maker management apparatus 5 (S111). And, the manufacturing apparatus 3 issues an acquisition request for manufacturing information to the designing information management apparatus 2 (S112), and the manufacturing information receiving unit 31 receives the manufacturing information responding to the acquisition request (S113). Then, the drive controlling unit 34 generates manufacturing data based on the received library information and manufacturing information, and performs drive-control on the manufacturing apparatus 3 (S114).

In this way, since the non-public component information is not transmitted directly to the end manufacturers, the non-public component information can be prevented from spreading more than necessary. Especially, in a business form of purchasing manufacturing apparatus made in Japan and actually operating a manufacturing business overseas, the present invention is effective since it is capable of preventing the non-public information from spreading overseas more than necessary.

Fourth Embodiment of the Invention

An information administration system according to this embodiment will be described using FIG. 12 to FIG. 14. The information administration system according to this embodiment is enhanced from the information administration system according to the third embodiment in function that the library information according to the non-public component information can be referred to only when a component contained in the designing information is identified to be the same as a component being incorporated in a semiconductor device, at the time of manufacturing the semiconductor device by the manufacturing apparatus.

In this regard, description overlapping with the description of the first embodiments will be omitted, in this embodiment.

Figure 12:
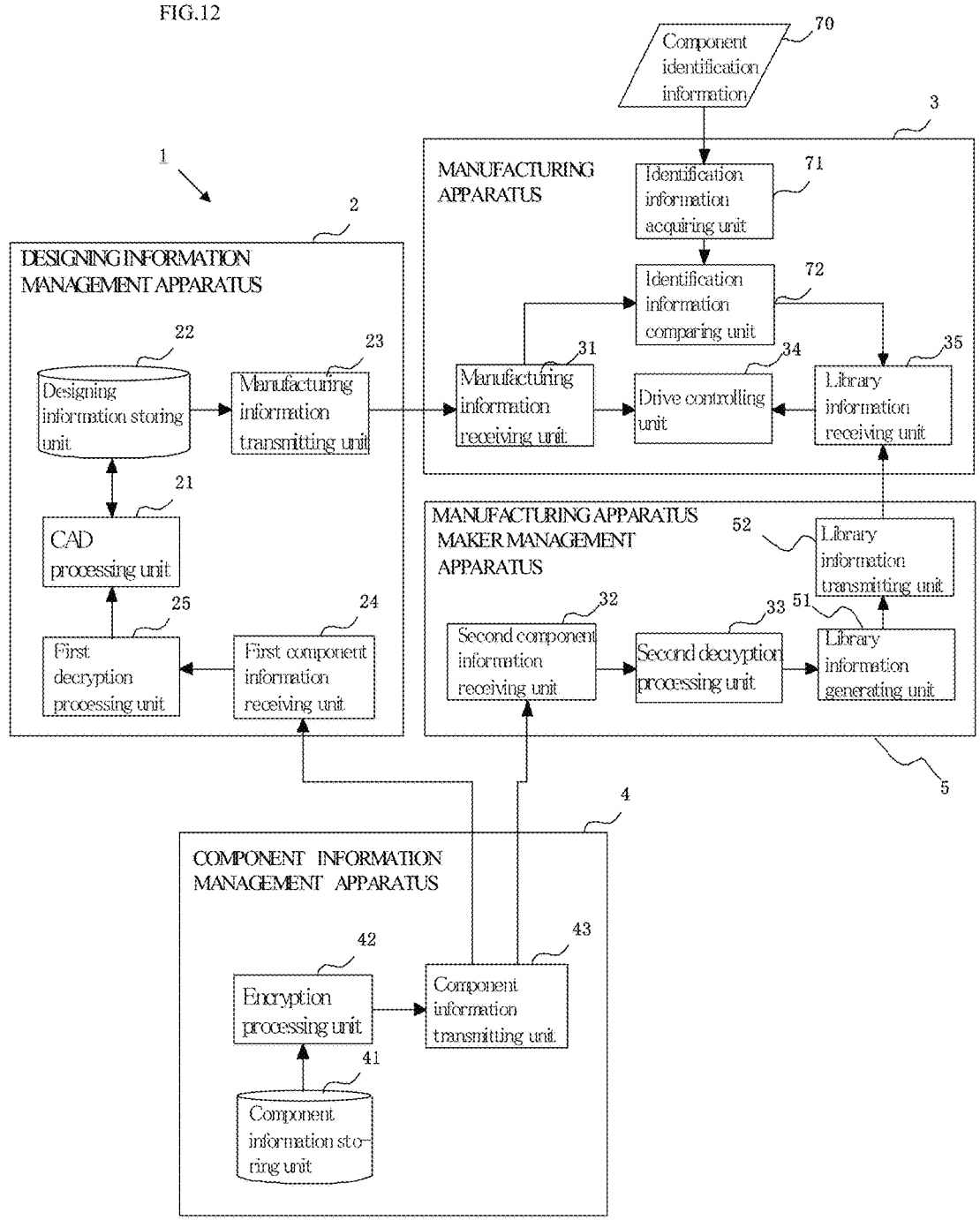
FIG. 12 is a functional block diagram of an information administration system according to a fourth embodiment.
Figure 13:
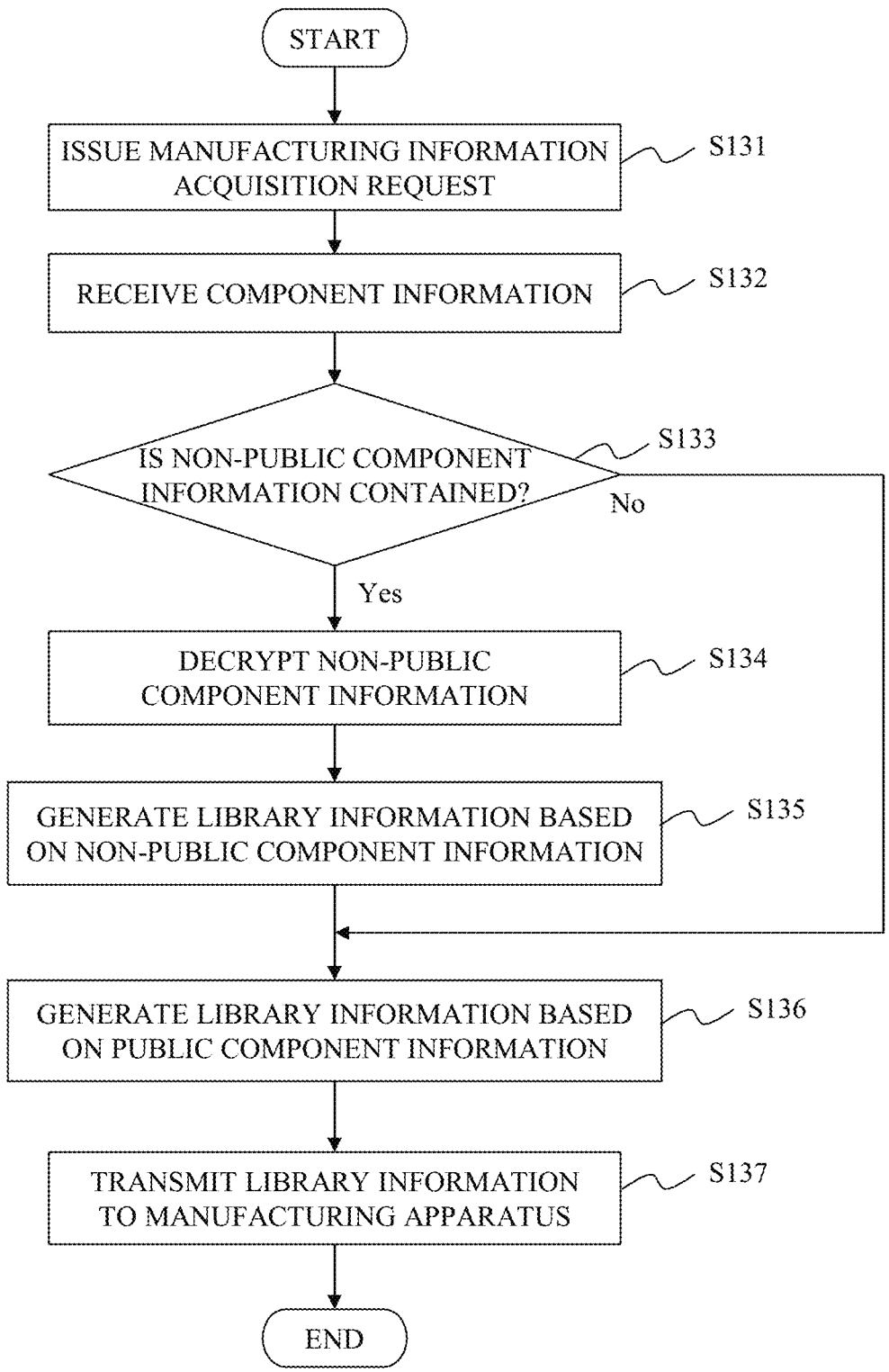
FIG. 13 is a flowchart showing an operation of a manufacturing apparatus maker management apparatus in the information administration system according to the fourth embodiment.

FIG. 12 is a functional block diagram of the information administration system according to this embodiment. Although the configuration of the designing information management apparatus 2 and the configuration of the component information management apparatus 4 are respectively the same as those in the third embodiment shown in FIG. 9, the configurations and functions of the manufacturing apparatus maker management apparatus 5 and the manufacturing apparatus 3 are different therefrom. The library information generating unit 51 in the manufacturing apparatus maker management apparatus 5 generates library information based on the decrypted non-public component information for manufacturing 411b, 412b, and also generates library information based on the public component information 400, and then the library information transmitting unit 52 transmits the respective library information to the manufacturing apparatus 3.

The manufacturing apparatus 3 is newly provided with: an identification information acquiring unit 71, which acquires identification information 70 of a component to be incorporated in a semiconductor device at the time of manufacturing the semiconductor device; and an identification information comparing unit 72, which judges whether the acquired identification information 70 of the component and identification information of a component contained in the manufacturing information received by the manufacturing information receiving unit 31 (i.e., the identification information of the component incorporated in the designing information at the time of designing) are identical to each other.

As the result of the judgment by the identification information comparing unit 72, when the pieces of identification information are identical, it indicates that the component according to the component information provided from the component information management apparatus 4 has been properly used at the time of manufacturing, therefore drive on the manufacturing apparatus 3 is to be controlled using the library information generated based on the non-public component information for manufacturing 411b, 412b. On the other hand, when the pieces of identification information are not identical, it indicates that the component according to the component information provided from the component information management apparatus 4 has not been properly used at the time of manufacturing, therefore drive on the manufacturing apparatus 3 is to be controlled using the library information generated based on the public component information 400.

Next, operations of the information administration system 1 will be described. Operations of the designing information management apparatus 2 and the component information management apparatus 4 are respectively the same as the operations thereof shown in FIG. 4 and FIG. 5 according to the first embodiment. FIG. 13 is a flowchart showing an operation of the manufacturing apparatus maker management apparatus 5 according to this embodiment. First, the manufacturing apparatus maker management apparatus 5 issues an acquisition request for component information to the component information management apparatus 4 (S131). The second component information receiving unit 32 receives the component information responding to the acquisition request (S132). The component information is judged whether any non-public component information for manufacturing 411b, 412b is contained therein (S133). When it is contained, the second decryption processing unit 33 decrypts the non-public component information for manufacturing 411b, 412b using a decryption key which has been distributed in advance (S134). And, the library information generating unit 51 generates library information for operating the manufacturing apparatus 3 based on the decrypted non-public component information for manufacturing 411b, 412b (S135). After the library information is generated based on the non-public component information for manufacturing 411b, 412b, or when any non-public component information for manufacturing 411b, 412b is not contained in the component information, the library information generating unit 51 generates library information based on the public component information 400 (S136). Then, the library information transmitting unit 52 transmits the generated library information to the manufacturing apparatus 3 (S137).

Figure 14:
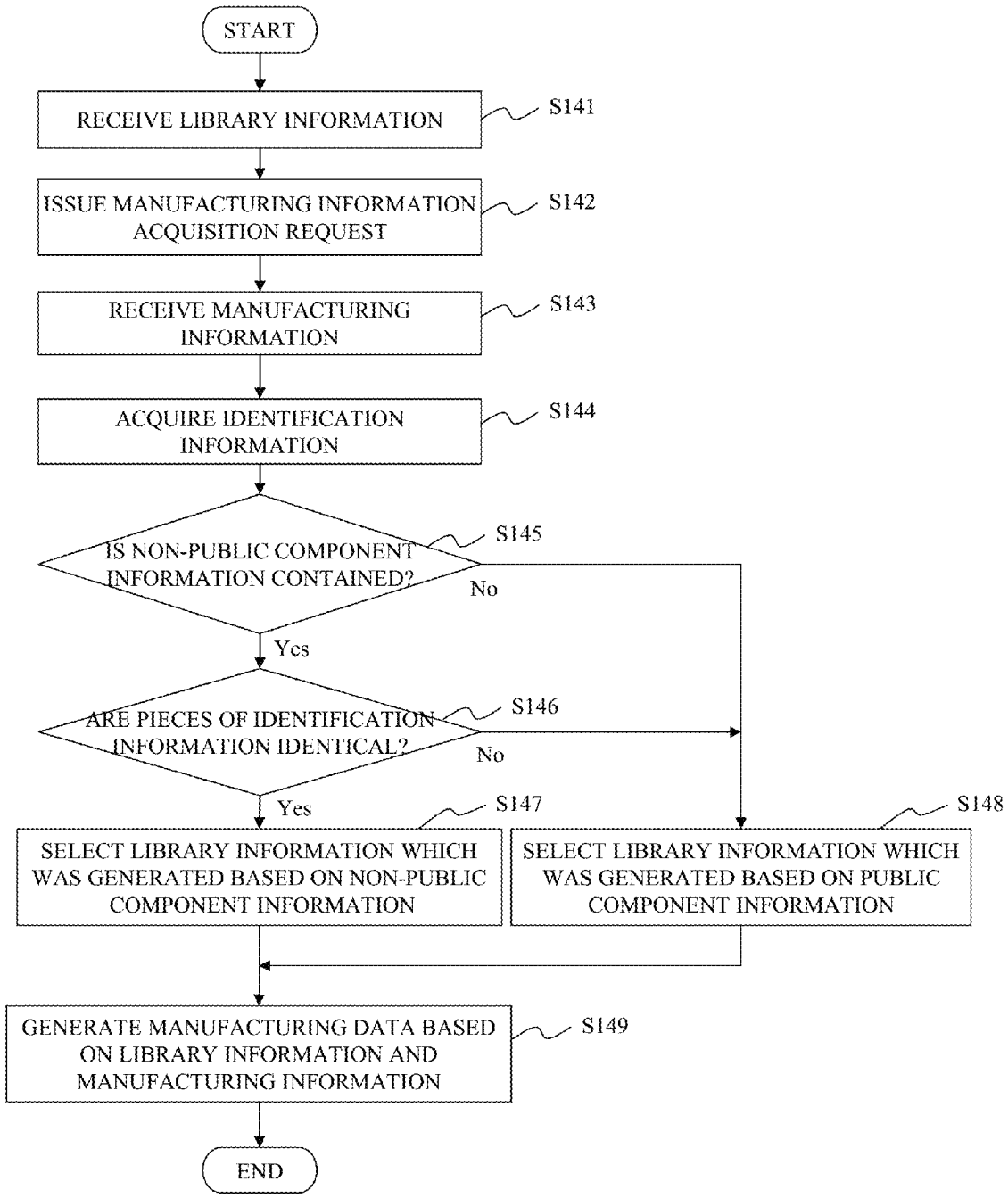
FIG. 14 is a flowchart showing an operation of a manufacturing apparatus in the information administration system according to the fourth embodiment.

FIG. 14 is a flowchart showing an operation of the manufacturing apparatus 3 according to this embodiment. First, the library information receiving unit 35 receives the library information transmitted from the manufacturing apparatus maker management apparatus 5 (S141). And, the manufacturing apparatus 3 issues an acquisition request for manufacturing information to the designing information management apparatus 2 (S142), and the manufacturing information receiving unit 31 receives the manufacturing information responding to the acquisition request (S143). The identification information acquiring unit 71 acquires the identification information 70 of the component to be incorporated at the time of manufacturing (S144). The identification information 70 can be acquired, for example, from the information of a bar code or a QR code indicated on a reel etc. of the component.

The component information is judged whether any non-public component information for manufacturing 411b, 412b is contained therein (S145). When it is not contained, the library information which was generated based on the public component information 400 is to be selected (S148). On the other hand, when it is contained, the identification information comparing unit 72 judges whether the pieces of identification information are identical to each other (S146). When they are not identical, the process in S148 is to be executed. On the other hand, when they are identical, the library information which was generated based on the non-public component information for manufacturing 411b, 412b is to be selected (S147). And, the drive controlling unit 34 generates manufacturing data for normally driving the manufacturing apparatus 3 based on the selected library information and the received manufacturing information (S149). Thereafter, the manufacturing apparatus 3 is to be driven in accordance with the generated manufacturing data, and then a semiconductor device as a production object is to be manufactured.

In this way, since the library information generated based on the non-public component information for manufacturing 411b, 412b can be referred to only when a component to be incorporated in a semiconductor device at the time of manufacturing the semiconductor device and a component contained in the designing information are identical to each other, the component manager can obtain assurance that the product dealt by the component manager's company is to be assuredly incorporated in the semiconductor device, in return for providing the non-public component information for manufacturing 411b, 412b, thereby allowing the system to be extremely effectively functioned both for the manufacturer and the parts maker.

Additionally, in the respective embodiments described above, it is preferably configured to embed an expiration date in the non-public component information at the time of encrypting the non-public component information so that any data past the expiration date cannot be decrypted. Further, the encrypted data may be stored in hardware such as an USB memory so as to put it into practice with a hardware key.

While various embodiments of the innovation have been particularly shown and described, it will be understood by those skilled in the art that various changes in form and details may be made therein without departing from the spirit and scope of the innovation as defined by the appended claims.

DESCRIPTION OF THE NUMERALS

1 Information administration system
2 Designing information management apparatus
3 Manufacturing apparatus
4 Component information management apparatus
5 Manufacturing apparatus maker management apparatus
21 CAD processing unit
22 Designing information storing unit
23 Manufacturing information transmitting unit
24 First component information receiving unit
25 First decryption processing unit
31 Manufacturing information receiving unit
32 Second component information receiving unit
33 Second decryption processing unit
34 Drive controlling unit
35 Library information receiving unit
41 Component information storing unit
42 Encryption processing unit
43 Component information transmitting unit
51 Library information generating unit
52 Library information transmitting unit
70 Component identification information
71 Identification information acquiring unit
72 Identification information comparing unit
400 Public component information
410, 411, 412 Non-public component information
411a, 412a Non-public component information for designing
411b, 412b Non-public component information for manufacturing

What is claimed is:
1. An information administration system, comprising:
a designing information management apparatus, which manages designing information of a production object;
a manufacturing apparatus, which manufactures the production object based on the designing information; and
a component information management apparatus, which manages component information on components constituting the production object, the components comprising parts and/or materials of the production object;
wherein the component information management apparatus comprises:
a first memory;
a first processor that executes instructions received from the first memory; and
a first interface, wherein
the first memory includes a component information storing unit, which stores the component information after sectionalizing the component information into public component information that is publicly open and nonpublic component information that is not publicly open and is made to correspond to the public component information, the public component information and the non-public component information being a same kind of electrical property information, and also sectionalizing the non-public component information into non-public component information for designing and non-public component information for manufacturing, the public component information comprising theoretical values of the electrical property information of the entire components and the non-public component information comprising effective values of the electrical property information of the respective components,
the first processor includes an encryption processing unit, which encrypts the non-public component information with respect to each of the designing information management apparatus and the manufacturing apparatus, and
the first interface includes a component information transmitting unit, which transmits the public component information and the encrypted nonpublic component information to the respectively corresponding designing information management apparatus and manufacturing apparatus; the designing information management apparatus comprises:
a second memory;
a second processor that executes instructions received from the second memory; and
a second interface, wherein
the second interface includes a first component information receiving unit, which receives the component information transmitted from the component information management apparatus,
the second processor includes a first decryption unit, which decrypts the non-public component information for designing when the non-public component information for designing is contained in the received component information,
the second memory includes a designing information storing unit, which stores the designing information that is designed by adding the received component information thereto, and
the second interface further includes a manufacturing information transmitting unit, which transmits a part or a whole of the designing information as manufacturing information to the manufacturing apparatus; the manufacturing apparatus comprises:
a third memory;
a third processor that executes instructions received from the third memory; and
a third interface, wherein
the third interface includes a manufacturing information receiving unit, which receives the manufacturing information, the third interface further includes a second component information receiving unit, which receives the component information,
the third processor includes a second decryption processing unit, which decrypts the non-public component information for manufacturing when the non-public component information for manufacturing is contained in the received component information, and
the third processor further includes a drive controlling unit, which generates manufacturing data for driving the manufacturing apparatus based on the received manufacturing information and component information, and then controls driving of the manufacturing apparatus, and communication between the component information management apparatus, the designing information management apparatus, and the manufacturing apparatus is performed over a network.

2. The information administration system according to claim 1, wherein the third processor of the manufacturing apparatus further includes:

an identification information acquiring unit, which acquires identification information of a component to be incorporated in the production object at the time of manufacturing the production object; and an identification information comparing unit, which compares the acquired identification information with identification information of the component contained in the manufacturing information received by the manufacturing information receiving unit; wherein the second decryption processing unit decrypts the non-public component information for manufacturing only when the pieces of identification information are identical to each other as the result of the comparison processing by the identification information comparing unit comparing means.

3. The information administration system according to claim 1, wherein the component information storing unit of the first memory stores the non-public component information after layering contents thereof in levels respectively corresponding to the designing information management apparatus and the manufacturing apparatus;

the encryption processing unit of the first processor performs encryption processing using respectively different encryption keys corresponding to the respective layered levels; and the first decryption unit and the second decryption unit respectively perform decryption processing corresponding to the respective layered levels.

4. An information administration system, comprising:

a designing information management apparatus, which manages designing information of a production object;

a manufacturing apparatus, which manufactures the production object based on the designing information;

a component information management apparatus, which manages component information on components constituting the production object; and a manufacturing apparatus maker management apparatus, which is managed by a manufacturing apparatus maker for making the manufacturing apparatus; wherein the component information management apparatus comprises:

a first memory;

a first processor that executes instructions received from the first memory; and a first interface, wherein the first memory includes a component information storing unit, which stores the component information after sectionalizing the component information into public component information that is publicly open and nonpublic component information that is not publicly open and is made to correspond to the public component information, the public component information and the non-public component information being a same kind of electrical property information, and also sectionalizing the non-public component information into non-public component information for designing and non-public component information for manufacturing, the public component information comprising theoretical values of the electrical property information of the entire components and the non-public component information comprising effective values of the electrical property information of the respective components, the first processor includes an encryption processing unit, which encrypts the non-public component information with respect to each of the designing information management apparatus and manufacturing apparatus, and the first interface includes a component information transmitting unit, which transmits the public component information and the encrypted nonpublic component information to the respectively corresponding designing information management apparatus and manufacturing apparatus maker management apparatus of the manufacturing apparatus maker for making the manufacturing apparatus;

the designing information management apparatus comprises:

a second memory;

a second processor that executes instructions received from the second memory; and a second interface, wherein the second interface includes a first component information receiving unit, which receives the component information transmitted from the component information management apparatus, the second processor includes a first decryption unit, which decrypts the non-public component information for designing when the non-public component information for designing is contained in the received component information, the second memory includes a designing information storing unit, which stores the designing information that is designed by adding the received component information thereto, and the second interface further includes a manufacturing information transmitting unit, which transmits a part or a whole of the designing information as manufacturing information to the manufacturing apparatus; the manufacturing apparatus maker management apparatus comprises:

a third memory;

a third processor that executes instructions received from the third memory; and a third interface, wherein the third interface includes a second component information receiving unit, which receives the component information; the third processor includes a second decryption unit, which decrypts the non-public component information for manufacturing when the non-public component information for manufacturing is contained in the received component information;

the third processor further includes a library information generating unit, which generates library information for the manufacturing apparatus according to the contents of the component information, based on the received component information; and the third interface further includes a library information transmitting unit, which transmits the library information to the manufacturing apparatus; the manufacturing apparatus comprises:

a fourth memory;

a fourth processor that executes instructions received from the fourth memory; and a fourth interface, wherein the fourth interface includes a manufacturing information receiving unit, which receives the manufacturing information;

the fourth interface further includes a library information receiving unit, which receives the library information; and the fourth processor includes a drive controlling unit, which generates manufacturing data for driving the manufacturing apparatus based on the received manufacturing information and library information and then controls driving of the manufacturing apparatus, and communication between the component information management apparatus, the designing information management apparatus, the manufacturing apparatus maker management apparatus, and the manufacturing apparatus is performed over a network.

5. The information administration system according to claim 4, wherein the library information generating unit generates:

first library information, which is based on the contents of the non-public component information for manufacturing in the component information; and second library information, which is based only on the public component information without regard for the contents of the non-public component information for manufacturing, the fourth interface of the manufacturing apparatus further includes:

an identification information acquiring unit, which acquires identification information of a component to be incorporated in the production object at the time of manufacturing the production object and the fourth processor of the manufacturing apparatus further includes an identification information comparing unit, which compares the acquired identification information with identification information of the component contained in the manufacturing information received by the manufacturing information receiving unit, and as the result of the comparison processing by the identification information comparing unit, the drive controlling unit generates:

manufacturing data based on the first library information when the pieces of identification information are identical to each other; and manufacturing data based on the second library information when the pieces of identification information are not identical to each other.

\* \* \* \* \*